United States Patent
Gupta

(10) Patent No.: US 11,151,545 B1
(45) Date of Patent: Oct. 19, 2021

(54) SMART-CARD WITH BUILT-IN OBJECT RESOLUTION AND DIRECT NETWORK INTERFACE

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/931,613

(22) Filed: Jul. 17, 2020

(51) Int. Cl.
  *G06Q 20/34* (2012.01)
  *G06K 19/07* (2006.01)
  *G06K 19/077* (2006.01)

(52) U.S. Cl.
  CPC ..... *G06Q 20/3415* (2013.01); *G06K 19/0704* (2013.01); *G06K 19/07707* (2013.01); *G06K 19/07709* (2013.01); *G06Q 20/352* (2013.01); *G06Q 20/3563* (2013.01)

(58) Field of Classification Search
  CPC .......... G06Q 20/3415; G06Q 20/3563; G06Q 20/352; G06K 19/07707; G06K 19/07709; G06K 19/0704
  See application file for complete search history.

(56) References Cited

U.S. PATENT DOCUMENTS

| | | | |
|---|---|---|---|
| 2014/0052632 A1* | 2/2014 | Galloway | G06Q 20/223 705/43 |
| 2017/0289127 A1* | 10/2017 | Hendrick | H04W 12/068 |
| 2019/0286805 A1 | 9/2019 | Law et al. | |

* cited by examiner

*Primary Examiner* — Sonji N Johnson
(74) *Attorney, Agent, or Firm* — Weiss & Arons LLP; Michael A. Springs, Esq.

(57) ABSTRACT

Systems and methods for secure and efficient transaction resolution and execution are provided. A method may include capturing, via a camera embedded in a smart card, an image of an object. The object may be associated with one of a plurality of service categories. The method may include processing the image and determining the service category, from the plurality of service categories, which is associated with the object. The method may also include determining a service provider that provides the service of the service category for a user associated with the smart card, and determining a monetary balance owed by the user to the service provider for the service. The method may also include executing a payment, via a wireless communication element that is embedded in the smart card, in the amount of the monetary balance, from an account associated with the user to the service provider.

20 Claims, 6 Drawing Sheets

SMART-CARD WITH BUILT-IN OBJECT RESOLUTION AND DIRECT NETWORK INTERFACE

FIELD OF TECHNOLOGY

Aspects of the disclosure relate to computer systems. Specifically, aspects of the disclosure relate to systems and methods for increasing security and efficiency in digital transactional networks.

BACKGROUND OF THE DISCLOSURE

It is common for consumers to have at least one payment instrument, such as a credit or debit card, easily accessible. Consumers typically execute transactions, including the payment of bills, using those payment instruments.

However, conventional payment instruments are usually unable to execute the transactions without the assistance of other devices. Exemplary devices include laptops, desktops, and mobile phones. Requiring the use of other devices is inconvenient and inefficient. Using other devices may also expose the transaction to security risks.

Furthermore, consumers executing transactions, such as payment of utility bills, typically engage in a multi-step process that includes determining the utility which must be paid, how that utility can be paid, and subsequently executing the payment via the instrument.

It would be desirable, therefore, to provide systems and methods for smart payment instruments with self-contained transaction architecture, thereby increasing the efficiency and security of transactions executed via the smart payment instruments. It would be further desirable for the smart payments instruments to streamline the transaction execution process.

SUMMARY OF THE DISCLOSURE

Aspects of the disclosure relate to platforms for secure and efficient transaction resolution and execution. A platform may include a smart card that may include a microprocessor, a camera, a power source for the microprocessor and the camera, a wireless communication element configured to provide wireless communication between the smart card and a central system and/or payment gateway, and a non-transitory memory storing computer-executable instructions that run on the microprocessor.

The platform may be configured to capture, via the camera, an image of an object. The object may be associated with one of a plurality of service categories. The platform may be configured to process the image of the object via an image processing module, and to determine the service category, from the plurality of service categories, which is associated with the object.

The platform may be configured to determine a service provider, from a plurality of service providers, that provides the service of the service category for a user associated with the platform, and to determine a monetary balance owed by the user to the service provider for the service. The platform may be configured to execute a payment, in the amount of the monetary balance, from an account associated with the user to the service provider.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
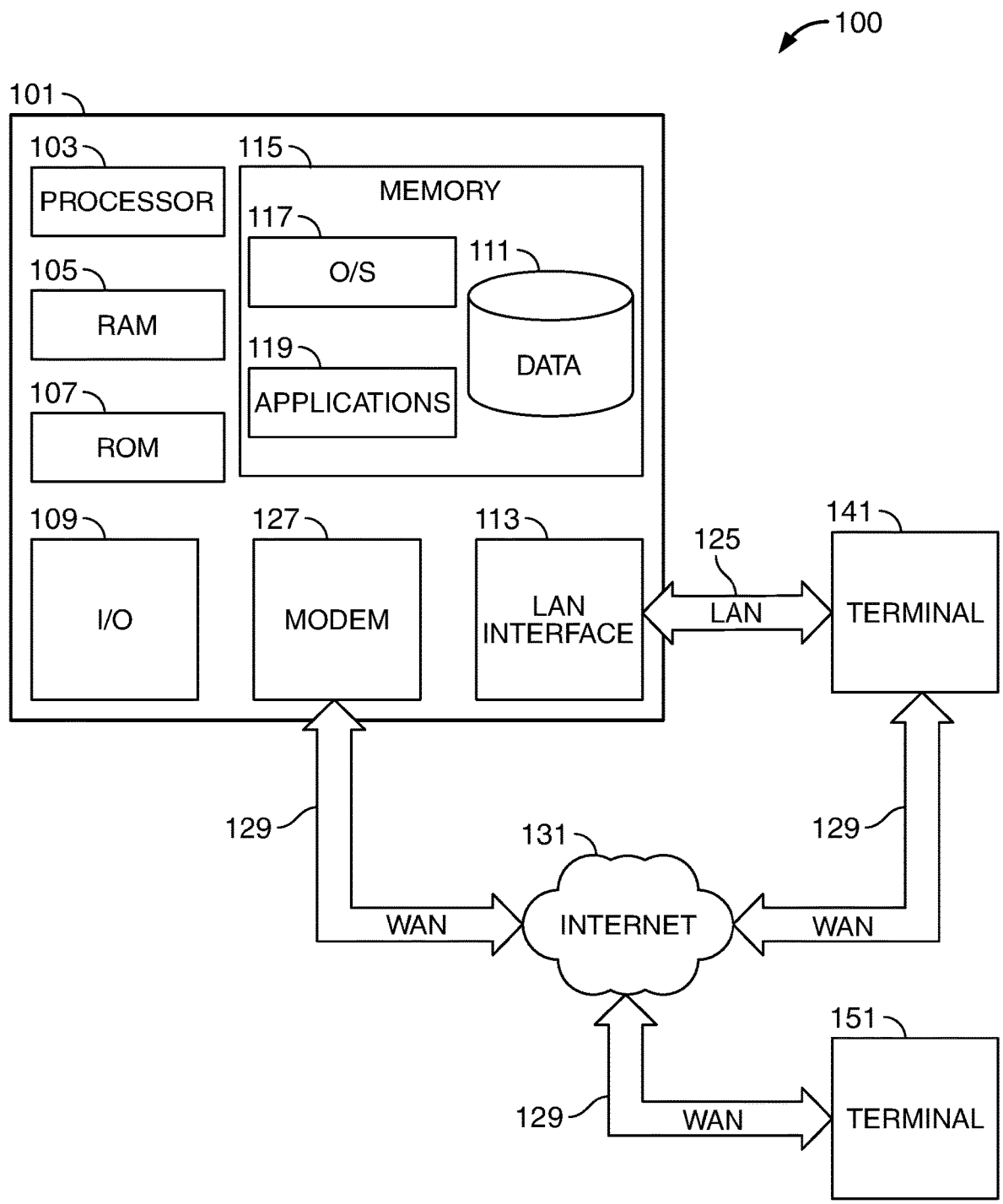
FIG. 1 shows an illustrative system in accordance with principles of the disclosure.

Systems and methods for secure and efficient transaction resolution and execution are provided. Systems and methods may include a platform that may include a smart card.

In certain embodiments, the smart card may include a housing made from metal and/or plastic. The card may at least partially resemble a typical debit or credit card. The housing may have dimensions that conform to the ISO/IEC 7810 ID-1 standard. The dimensions may, in some embodiments, be no greater than 86 millimeters×54 millimeters×0.8 millimeters.

The smart card may include a microprocessor, a camera, and a power source for the microprocessor and the camera. The smart card may include a wireless communication element configured to provide wireless communication between the smart card and a central system and/or payment gateway. The smart card may include a non-transitory memory storing computer-executable instructions that, when run on the microprocessor, are configured to perform some or all the disclosed features of the platform.

In certain embodiments, the wireless communication element may be a nano wireless network interface card ("NIC").

In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

The microprocessor, the camera, the power source, the wireless communication element, and/or the memory may be embedded in the smart card. In some preferred embodiments, the camera may be installed so that the lens is directed out of the rear of the card.

The platform may be configured to capture, via the camera, an image of an object. The object may be associated with one of a plurality of service categories. Illustrative objects may include a light bulb, a water faucet, or a boiler. The light bulb may be associated with an electric utility, the water faucet may be associated with a water utility, and the boiler may be associated with a gas utility.

The platform may be configured to process the image of the object via an image processing module. The platform may be configured to determine the service category, from the plurality of service categories, which is associated with the object.

The platform may be configured to determine a service provider, from a plurality of service providers, that provides the service of the service category for a user associated with the platform. The platform may be configured to determine a monetary balance owed by the user to the service provider for the service. The platform may be configured to execute a payment, in the amount of the monetary balance, from an account associated with the user to the service provider.

In some embodiments, a set of objects, the plurality of service categories, and/or the plurality of service providers may be preprogrammed and/or generated via an artificial intelligence (AI) component of the platform.

For example, in an illustrative embodiment, the system may be pre-programmed with a set of objects that includes a light bulb, a water faucet, and a boiler. The system may be configured with an image processing module—that may include an AI component—for determining if an image captured by the camera of a smart card is one of the objects in the set. The system may be preprogrammed to link each image with a service category and an associated service provider. The system may provide the user with the ability to program the objects, the service categories, and/or the service providers. The user may be enabled to program the system via the smart card itself or via an associated app viewable on a computing device such as a mobile phone. In some embodiments, the objects, the service categories, and/or the service providers may not be pre-programmed, and may be determined via AI. In some embodiments, the system may be configured to store, or cache, the objects, the service categories, and/or the service providers once determined. The storage may be internal to the smart card. The storage may reduce the processing for a future transaction, making the system more efficient.

In certain embodiments, determining the service provider may include transmitting a query to the plurality of service providers. The query may include identifying information stored in the memory of the smart card. The query may inquire if the identifying information achieves a match in a customer database of the service provider. When the smart card receives an affirmative response to the query, the platform may establish the sender of the affirmative response as the service provider.

In some embodiments, determining the monetary balance may include transmitting a query to the service provider. The query may include identifying information stored in the memory of the smart card. The query may inquire of the service provider for the monetary balance indicated in a customer database as being owed by the user to the service provider for the service. The user may be identified in the customer database at least in part based on the identifying information.

In certain embodiments, the smart card may include a display screen and a tactile sensor. The platform may be further configured to display payment information on the display screen, and execute the payment when authorization is received via the tactile sensor. In certain embodiments, the display screen and the tactile sensor may be combined in a touchscreen. The display screen may be affixed to the card and may be viewable on a surface of the card.

In some embodiments, authorization may include entry of a personal identification number (PIN).

A method for secure and efficient transaction resolution and execution is provided. The method may include capturing, via a camera embedded in a smart card, an image of an object. The object may be associated with one of a plurality of service categories.

The method may include processing the image of the object via an image processing module embedded in the smart card; determining the service category, from the plurality of service categories, which is associated with the object; determining a service provider, from a plurality of service providers, that provides the service of the service category for a user associated with the smart card; determining a monetary balance owed by the user to the service provider for the service; and executing a payment, in the amount of the monetary balance, from an account associated with the user to the service provider. Executing the payment may be performed via a wireless communication element that may be embedded in the smart card and configured to provide wireless communication between the smart card and a central system and/or payment gateway.

In certain embodiments, the method may include preprogramming the plurality of service categories and/or the plurality of service providers. The method may include generating the plurality of service categories and/or the plurality of service providers via an artificial intelligence (AI) component of the platform.

Security and efficiency associated with transactions such as bill payments are thus improved. Security may be increased by providing a platform with dedicated transactional hardware, software, and/or communication channels. Such a platform may be associated with a decreased risk of infection with malware, spyware, or other security risk factors.

Efficiency may be increased by enabling a user to perform the transaction without having to locate, parse, decipher, and act upon information in a bill. Efficiency may also be increased by eliminating the need to use a device external to a dedicated payment instrument to perform the transaction.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to transaction resolution, authorization, and/or execution.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transaction resolution, authorization, and/or execution.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
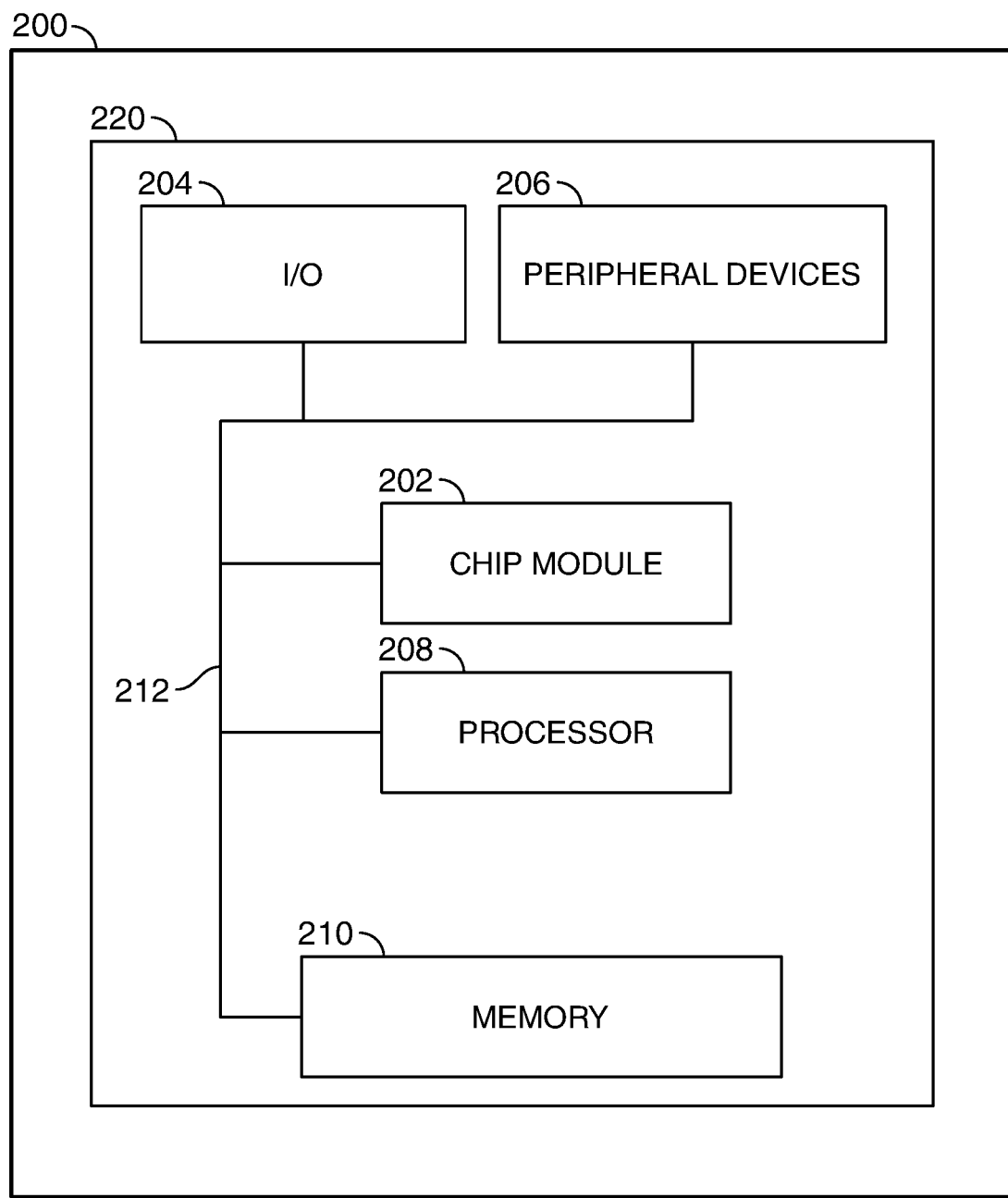
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
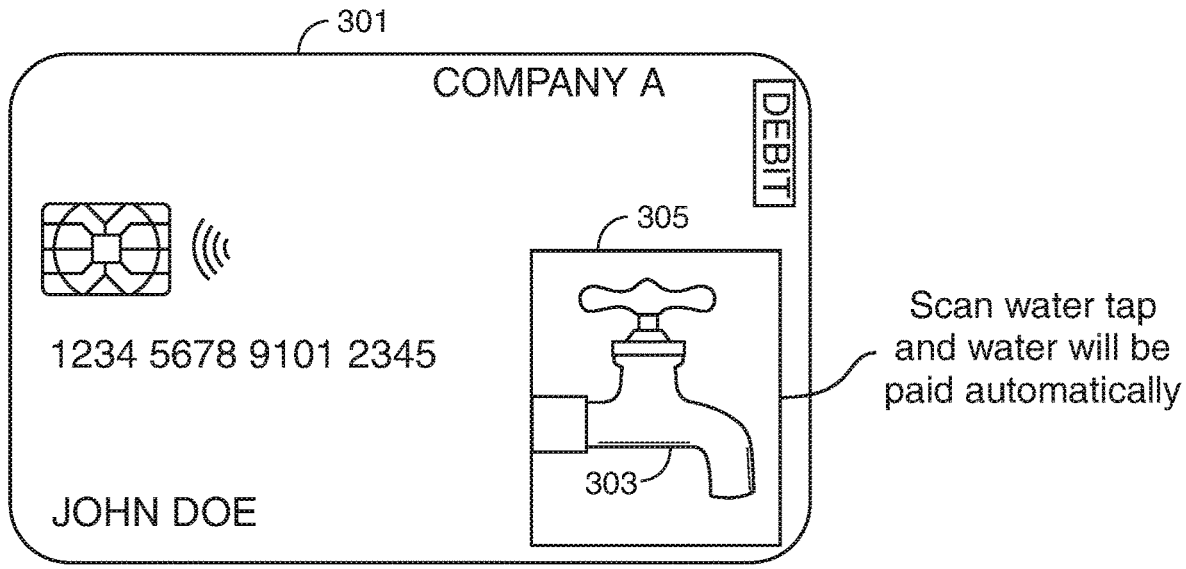
FIG. 3 shows another illustrative apparatus in accordance with principles of the disclosure.
Figure 4:
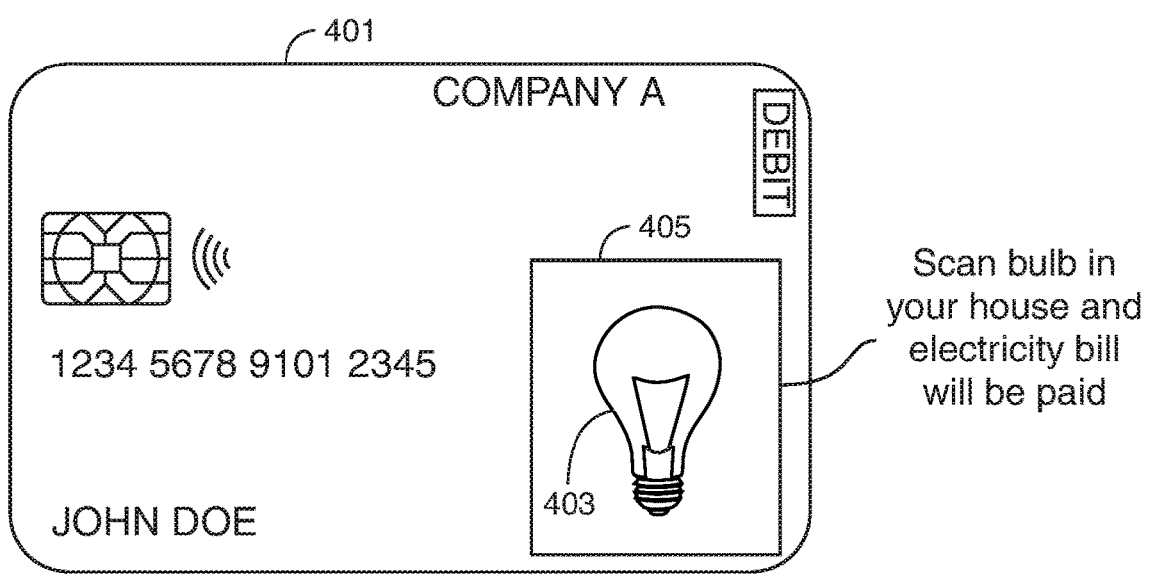
FIG. 4 shows yet another illustrative apparatus in accordance with principles of the disclosure.

FIGS. 3 and 4 show illustrative smart cards 301 and 401 configured in accordance with principles of the disclosure. The smart cards may be shown capturing images of illustrative objects. The object shown in FIG. 3 may be faucet 303. The faucet may be associated with a water utility service. The object shown in FIG. 4 may be light bulb 403.

The light bulb may be associated with an electricity utility service. Images of the objects may be captured by cameras embedded in the smart cards. The images may be shown in FIGS. 3 and 4 displayed on display screens 305 and 405 of the smart cards.

Figure 5:
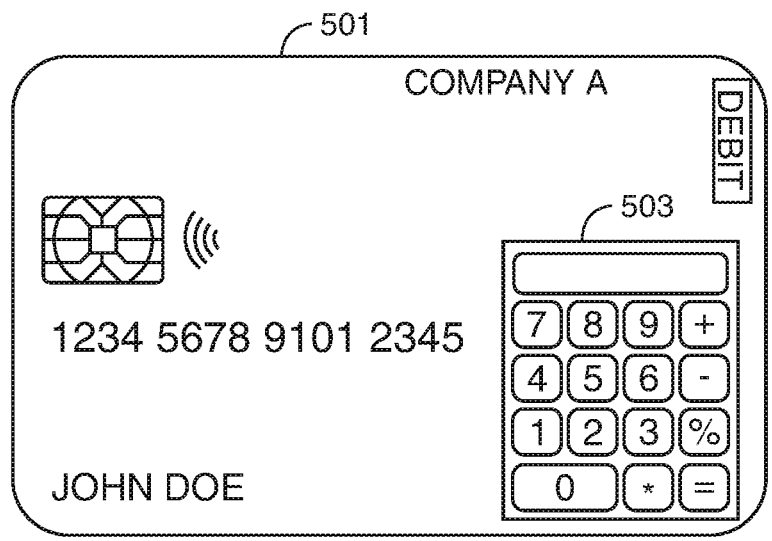
FIG. 5 shows still another illustrative apparatus in accordance with principles of the disclosure.

FIG. 5 shows illustrative smart card 501 configured in accordance with principles of the disclosure. The smart card 501 may be shown with a display and a tactile sensor (e.g., a keypad). The keypad and tactile sensor may be combined in touchscreen 503. Smart card 501 with touchscreen 503 may be configured to include an authorization process for a transaction. The authorization may include entry of a PIN via the tactile sensor in response to a payment amount and/or a service provider displayed on the display.

Figure 6:
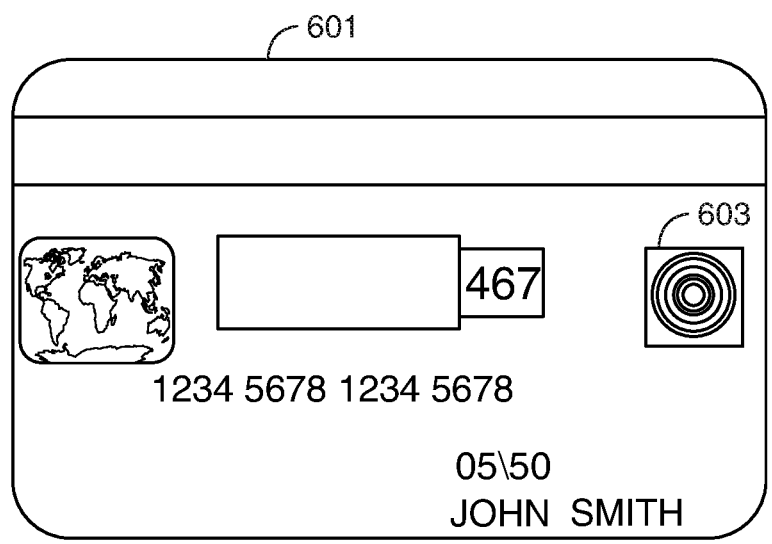
FIG. 6 shows yet another illustrative apparatus in accordance with principles of the disclosure.

FIG. 6 shows illustrative smart card 601 configured in accordance with principles of the disclosure. Smart card 601 shows camera 603 embedded in the smart card housing. The camera may be embedded in the rear of the smart card. The camera may be for capturing images of objects associated with service categories.

Figure 7:
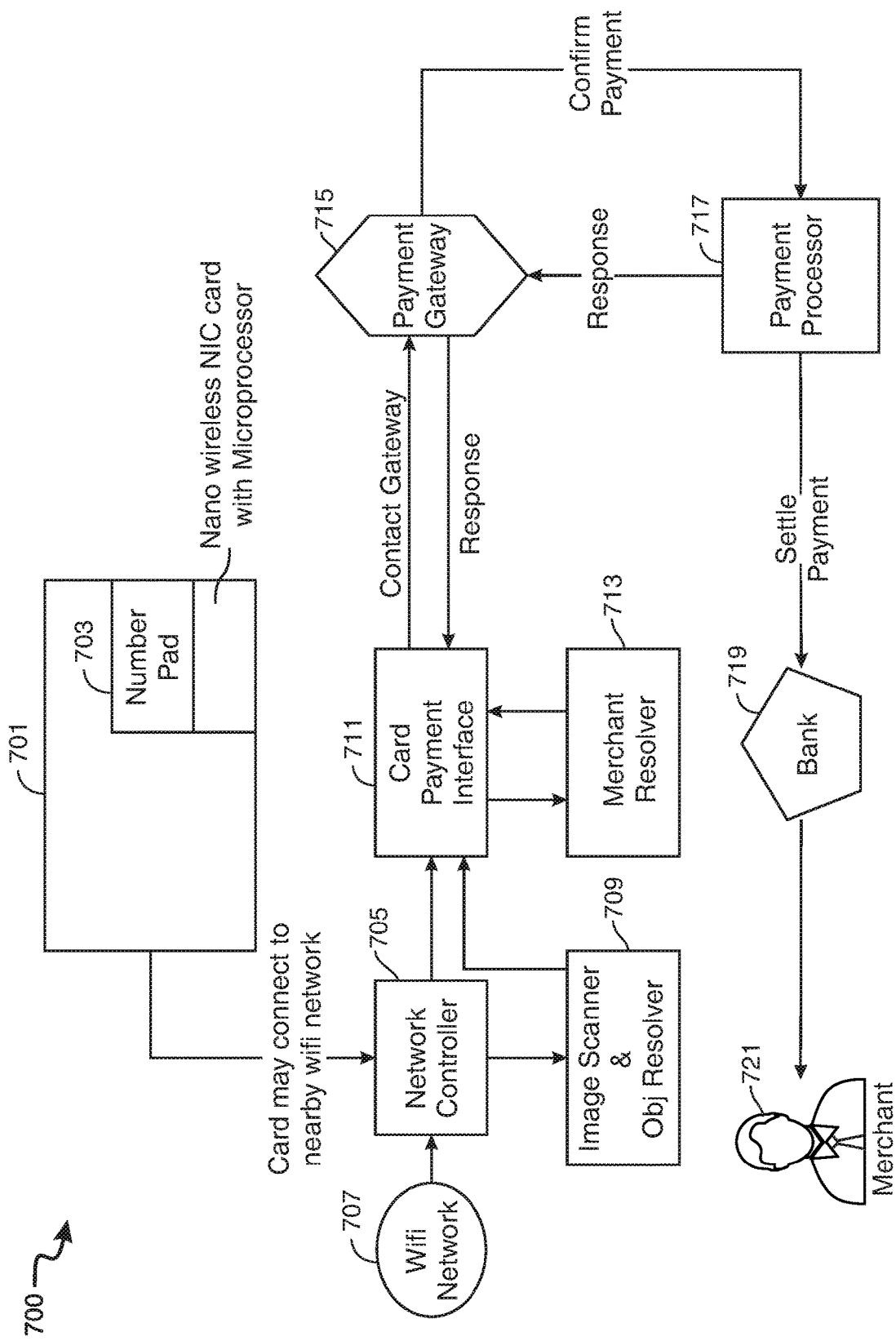
FIG. 7 shows an illustrative system diagram in accordance with principles of the disclosure.

FIG. 7 shows illustrative system diagram 700 in accordance with principles of the disclosure. Diagram 700 includes smart card 701. Smart card 701 may include a camera, wireless connector, microprocessor, and tactile sensor/display 703. Card 701 may connect to a nearby WiFi network 707 via a network controller 705. An image of an object captured by the camera of card 701 may be processed via element 709. Processing may include determining an identity of the object and an associated service category. The card may also determine a service provider via merchant resolver 713. The card may also determine an amount to pay the service provider. Card payment interface 711 may pay the amount owed over payment gateway 715, which may include payment processor 717. The payment may be executed from an account of the user at bank 719 to an account associated with service provider 721.

Figure 8:
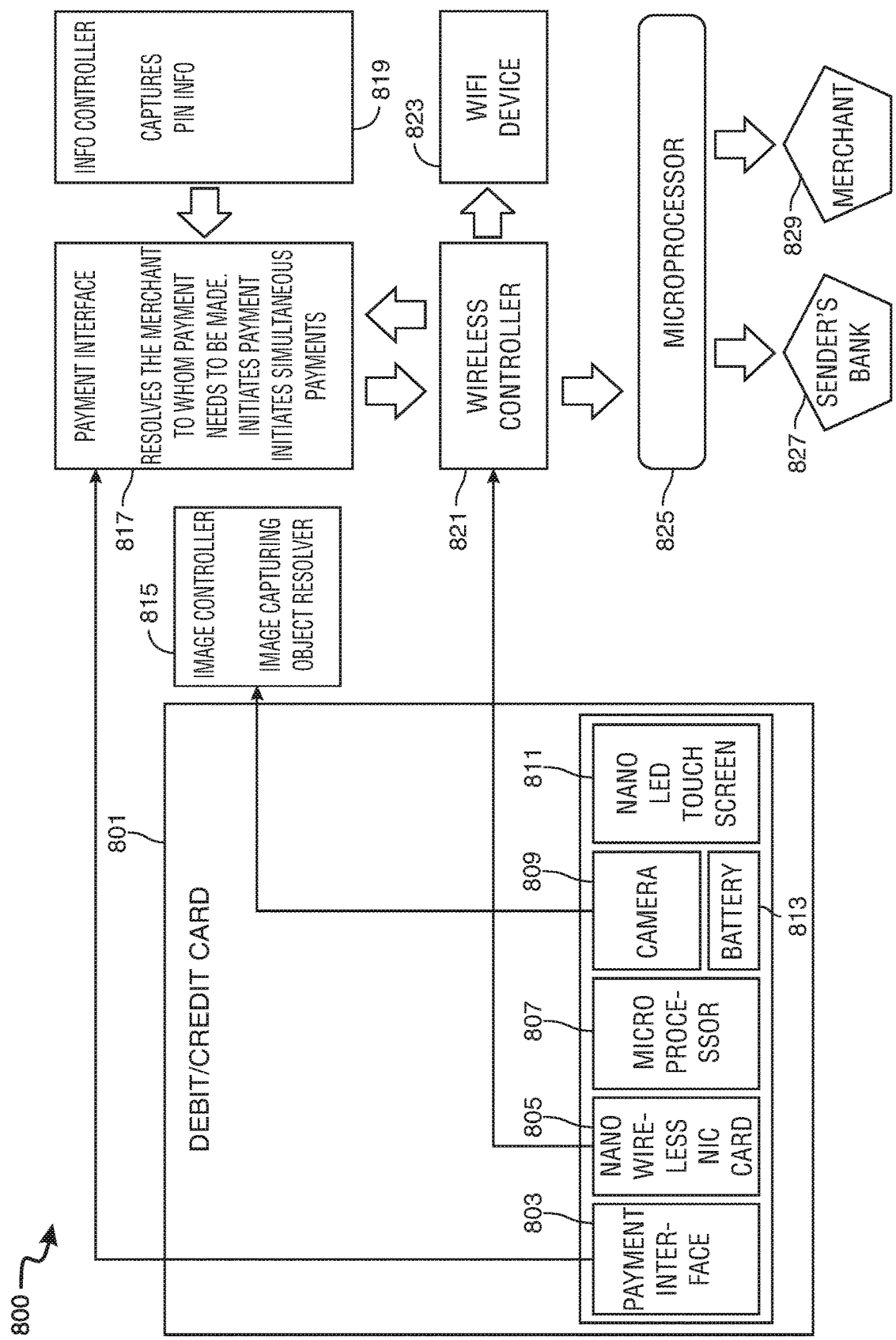
FIG. 8 shows another illustrative system diagram in accordance with principles of the disclosure.

FIG. 8 shows illustrative system diagram 800 in accordance with principles of the disclosure. Diagram 800 includes smart card 801. Card 801 includes payment interface 803, wireless connector 805, microprocessor 807, camera 809, touchscreen 811, and battery 813. Card 801 may capture an image of an object via camera 809. The image may be processed via image controller 815. Card 801 may determine an associated service category, a service provider, and an amount owed. Card 801 may execute the payment for the amount owed via payment interface 817. The payment may be authorized by the user. Authorization may leverage information entered via touchscreen 811, and may involve information controller 819. Card 801 may communicate via wireless controller 821, and may use WiFi device 823 to communicate to an outside network. Microprocessor 825 may coordinate the processing and communication of the system. Card 801 may execute payments to merchant (i.e., service provider) 829 through bank 827.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a smart-card with built-in object resolution and direct network interface are provided. Persons skilled in the art will appreciate that the present invention can be practiced by other than the described embodiments, which are presented for purposes of illustration rather than of limitation, and that the present invention is limited only by the claims that follow.

What is claimed is:

1. A platform for secure and efficient transaction resolution and execution, said platform comprising a smart card that comprises:
   a microprocessor;
   a camera;
   a power source for the microprocessor and the camera;
   a wireless communication element configured to provide wireless communication between the smart card and a central system and/or payment gateway; and
   a non-transitory memory storing computer-executable instructions, that, when run on the microprocessor, are configured to:
      capture, via the camera, an image of an object, said object associated with one of a plurality of service categories;
      process the image of the object via an image processing module;
      determine the service category, from the plurality of service categories, which is associated with the object;
      determine a service provider, from a plurality of service providers, that provides the service of the service category for a user associated with the platform;
      determine a monetary balance owed by the user to the service provider for the service; and
      execute a payment, in the amount of the monetary balance, from an account associated with the user to the service provider.

2. The platform of claim 1, wherein the plurality of service categories and the plurality of service providers are preprogrammed and/or generated via an artificial intelligence (AI) component of the platform.

3. The platform of claim 1, wherein determining the service provider comprises:
   transmitting a query to the plurality of service providers, said query comprising identifying information stored in the memory of the smart card, and said query querying if the identifying information achieves a match in a customer database of the service provider; and when the smart card receives an affirmative response to the query, establishing the sender of the affirmative response as the service provider.

4. The platform of claim 1, wherein determining the monetary balance comprises transmitting a query to the service provider, said query comprising identifying information stored in the memory of the smart card, and said query querying the service provider for the monetary balance indicated in a customer database as being owed by the user to the service provider for the service, wherein said user is identified in the customer database at least in part via the identifying information.

5. The platform of claim 1, further comprising a display screen and a tactile sensor, wherein the platform is further configured to display payment information on the display screen, and execute the payment when authorization is received via the tactile sensor.

6. The platform of claim 5, further comprising a touchscreen that comprises the display screen and the tactile sensor.

7. The platform of claim 5, wherein the authorization comprises entry of a personal identification number (PIN).

8. The platform of claim 1, wherein the smart card comprises a housing made from metal and/or plastic, and the housing has dimensions that conform to the ISO/IEC 7810 ID-1 standard, said dimensions being no greater than 86 millimeters×54 millimeters×0.8 millimeters.

9. The platform of claim 1, wherein:
the wireless communication element is a nano wireless network interface card ("NIC");
the power source is rechargeable via solar energy, inductive charging, and/or a charging port; and
the microprocessor, the camera, the power source, the wireless communication element, and the memory are embedded in the smart card.

10. A method for secure and efficient transaction resolution and execution, said method comprising:
capturing, via a camera embedded in a smart card, an image of an object, said object associated with one of a plurality of service categories;
processing the image of the object via an image processing module embedded in the smart card;
determining the service category, from the plurality of service categories, which is associated with the object;
determining a service provider, from a plurality of service providers, that provides the service of the service category for a user associated with the smart card;
determining a monetary balance owed by the user to the service provider for the service; and
executing a payment, in the amount of the monetary balance, from an account associated with the user to the service provider, said executing performed via a wireless communication element that is embedded in the smart card and configured to provide wireless communication between the smart card and a central system and/or payment gateway.

11. The method of claim 10, further comprising:
preprogramming the plurality of service categories and/or the plurality of service providers; and/or
generating the plurality of service categories and/or the plurality of service providers via an artificial intelligence (AI) component of the platform.

12. The method of claim 10, wherein determining the service provider comprises:

transmitting a query to the plurality of service providers, said query comprising identifying information stored in the memory of the smart card, and said query querying if the identifying information achieves a match in a customer database of the service provider; and when the smart card receives an affirmative response to the query, establishing the sender of the affirmative response as the service provider.

13. The method of claim 10, wherein determining the monetary balance comprises transmitting a query to the service provider, said query comprising identifying information stored in the memory of the smart card, and said query querying the service provider for the monetary balance indicated in a customer database as being owed by the user to the service provider for the service, wherein said user is identified in the customer database at least in part via the identifying information.

14. The method of claim 10, further comprising:
display payment information on a display screen embedded in the smart card; and
executing the payment when authorization is received via a tactile sensor embedded in the smart card.

15. The method of claim 14, wherein the smart card comprises a touchscreen that comprises the display screen and the tactile sensor.

16. The method of claim 14, wherein the authorization comprises entry of a personal identification number (PIN).

17. The method of claim 10, wherein the smart card comprises a housing made from metal and/or plastic, and the housing has dimensions that conform to the ISO/IEC 7810 ID-1 standard, said dimensions being no greater than 86 millimeters×54 millimeters×0.8 millimeters.

18. The method of claim 10, wherein:
the wireless communication element is a nano wireless network interface card ("NIC"); and
the smart card further comprises an embedded power source that is rechargeable via solar energy, inductive charging, and/or a charging port.

19. A smart card with secure and efficient transaction resolution and execution, said smart card comprising:
a housing made from metal and/or plastic, and the housing has dimensions that conform to the ISO/IEC 7810 ID-1 standard, said dimensions being no greater than 86 millimeters×54 millimeters×0.8 millimeters;
a microprocessor embedded in the housing;
a camera embedded in the housing;
a display screen embedded in the housing;
a tactile sensor embedded in the housing;
a power source embedded in the housing for the microprocessor, the camera, the display screen, and the tactile sensor, and the power source is rechargeable via solar energy, inductive charging, and/or a charging port;
a wireless communication element embedded in the housing and configured to provide wireless communication between the smart card and a central system and/or payment gateway, and the wireless communication element is a nano wireless network interface card ("NIC"); and
a non-transitory memory embedded in the housing and storing computer-executable instructions, that, when run on the microprocessor, are configured to:
capture, via the camera, an image of an object, said object associated with one of a plurality of service categories;
process the image of the object via an image processing module;

determine the service category, from the plurality of service categories, which is associated with the object;

determine a service provider, from a plurality of service providers, that provides the service of the service category for a user associated with the platform;

determine a monetary balance owed by the user to the service provider for the service;

display payment information on the display screen, said payment information comprising the monetary balance and/or the service provider; and when authorization is received via the tactile sensor, execute a payment, in the amount of the monetary balance, from an account associated with the user to the service provider.

20. The smart card of claim 19, wherein:

the plurality of service categories and the plurality of service providers are preprogrammed and/or generated via an artificial intelligence (AI) component of the platform;

the determining of the service provider comprises:

transmitting a query to the plurality of service providers, said query comprising identifying information stored in the memory of the smart card, and said query querying if the identifying information achieves a match in a customer database of the service provider; and when the smart card receives an affirmative response to the query, establishing the sender of the affirmative response as the service provider; and the determining of the monetary balance comprises transmitting a query to the service provider, said query querying the service provider for the monetary balance indicated in the customer database as being owed by the user to the service provider for the service.

* * * * *